United States Patent
Furuya

Patent Number: 5,560,718
Date of Patent: Oct. 1, 1996

[54] LABEL PRINTER WITH SIMULTANEOUS PRINTING AND STORING

[75] Inventor: Kazutoshi Furuya, Numazu, Japan

[73] Assignee: Kabushiki Kaisha TEC, Tokyo, Japan

[21] Appl. No.: 127,417

[22] Filed: Sep. 27, 1993

Related U.S. Application Data

[63] Continuation of Ser. No. 668,607, Mar. 13, 1991.

[30] Foreign Application Priority Data

Mar. 16, 1990 [JP] Japan ................................. 2-65683
Jun. 7, 1990 [JP] Japan ................................. 2-147468

[51] Int. Cl.$^6$ ................................. G06K 15/02
[52] U.S. Cl. ................................. 400/68; 395/116
[58] Field of Search ................................. 400/61, 63, 68, 400/76; 395/115, 116

[56] References Cited

U.S. PATENT DOCUMENTS

| | | | |
|---|---|---|---|
| 4,677,551 | 6/1987 | Suganuma | 364/401 |
| 4,831,554 | 5/1989 | Storace et al. | 364/519 |
| 4,858,138 | 8/1989 | Talmadge | 364/900 |
| 4,933,849 | 6/1990 | Connell et al. | 364/400 |
| 4,943,936 | 7/1990 | Hirai | 400/76 |
| 4,944,614 | 7/1990 | Tunaka | 400/68 |
| 4,988,221 | 1/1991 | Shibayama | 400/76 |
| 5,021,975 | 6/1991 | Yamanashi | 400/76 |
| 5,025,397 | 6/1991 | Suzuki | 400/76 |
| 5,104,245 | 4/1992 | Oguri | 400/76 |
| 5,108,207 | 4/1992 | Isobe et al. | 400/61 |

FOREIGN PATENT DOCUMENTS

| | | | |
|---|---|---|---|
| 0144723 | 8/1984 | European Pat. Off. | 400/76 |
| 0297567 | 1/1989 | European Pat. Off. | 400/68 |
| 2606907 | 5/1988 | France | 400/68 |
| 50-92040 | 7/1975 | Japan | 400/61 |
| 54-64937 | 5/1979 | Japan | 400/61 |
| 71081 | 5/1982 | Japan | 400/68 |
| 97885 | 5/1985 | Japan | 400/68 |
| 62-274 | 3/1986 | Japan | 338/298 |
| 3625 | 1/1989 | Japan | 400/121 |
| 2188878 | 10/1987 | United Kingdom | 400/61 |
| 2207095 | 1/1989 | United Kingdom | 400/68 |

*Primary Examiner*—Edgar S. Burr
*Assistant Examiner*—Steven S. Kelley
*Attorney, Agent, or Firm*—Frishauf, Holtz, Goodman, Langer & Chick

[57] ABSTRACT

A label printer includes a communication interface for sequentially inputting issue label data; a frame memory for storing print pattern data; a printing unit for printing print pattern data stored in the frame memory; and a processing circuit for creating print pattern data corresponding to input issue label data in the frame memory. With the above label printer, the processing circuit determines an empty area of the frame memory which is different from an area occupied by the to-be-printed print pattern data when issue label data is input from the communication interface and creates print pattern data corresponding to input issue label data in the empty area.

11 Claims, 5 Drawing Sheets

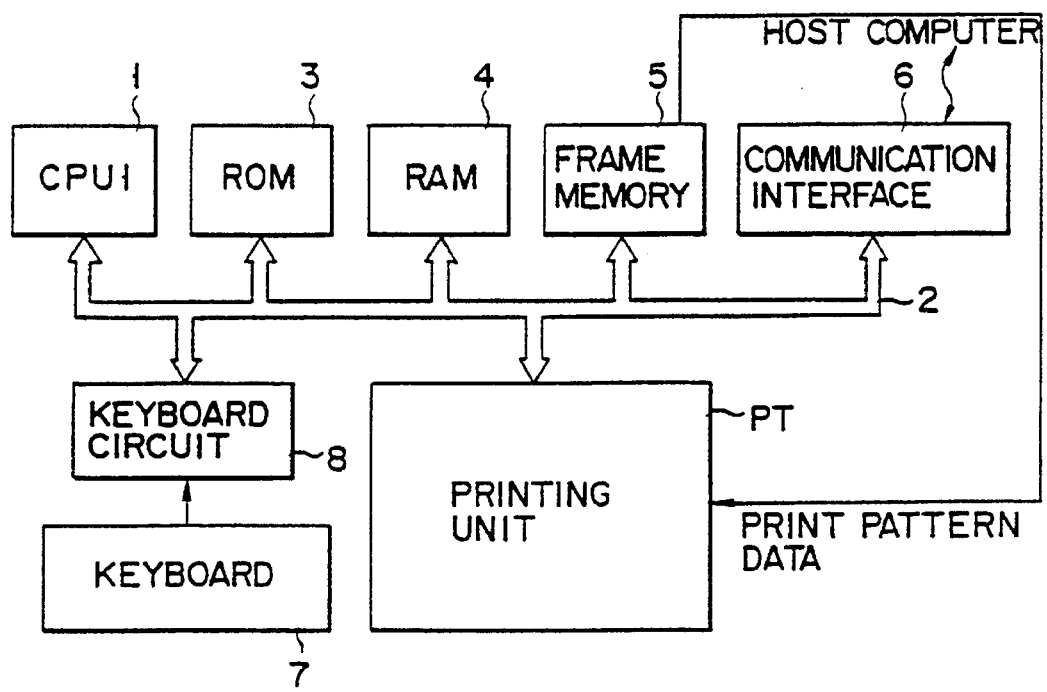
F I G. 1
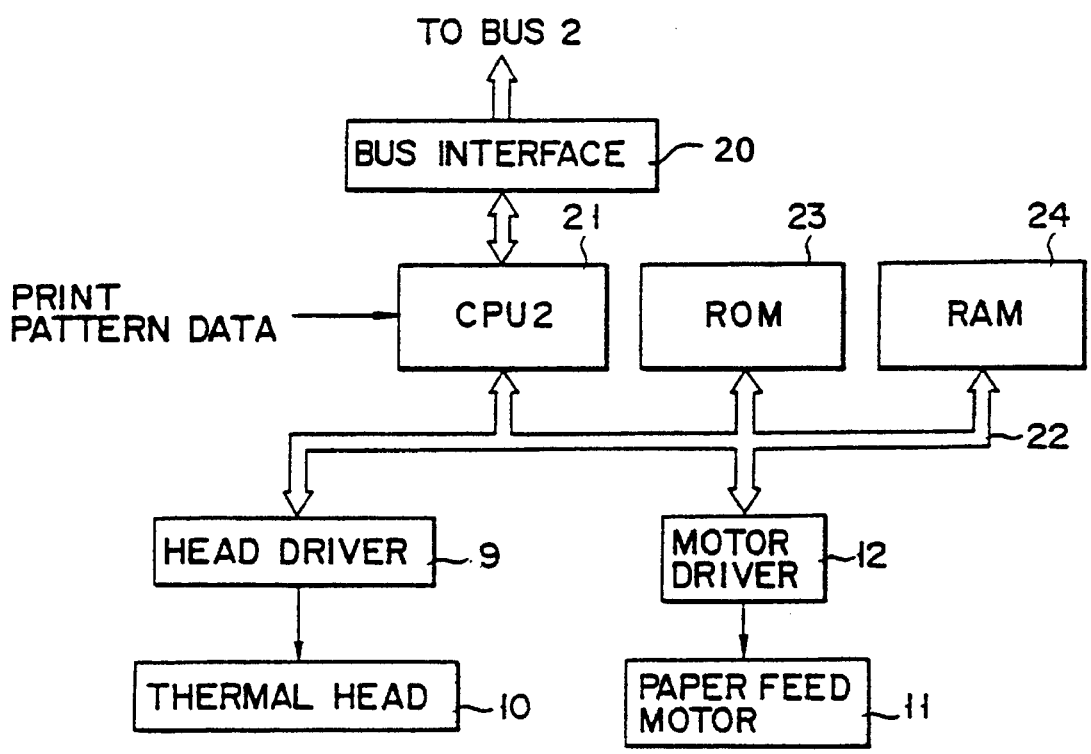
F I G. 2

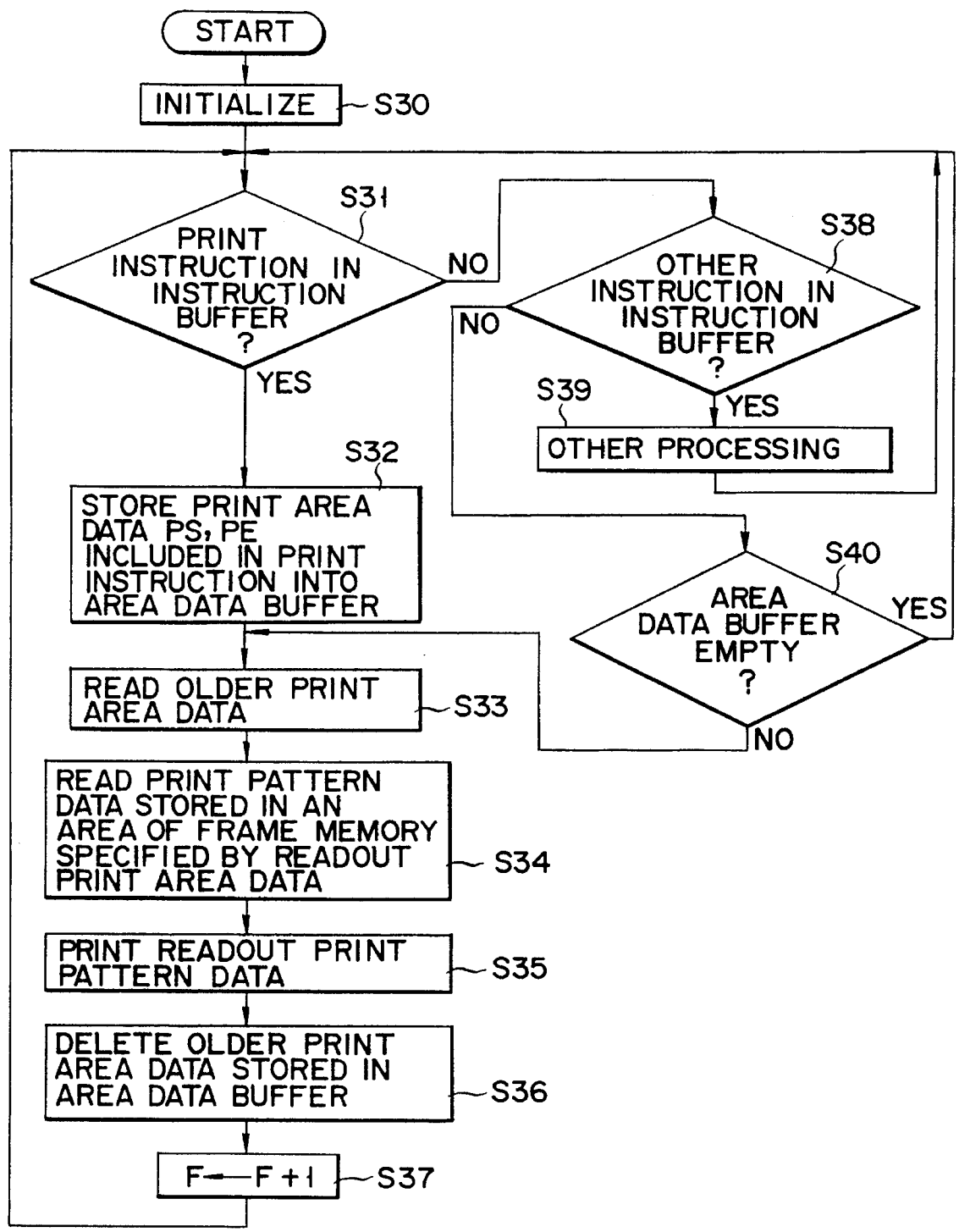
F I G. 4

LABEL PRINTER WITH SIMULTANEOUS PRINTING AND STORING

This application is a continuation of application Ser. No. 07/668,607, filed Mar. 13, 1991.

BACKGROUND OF THE INVENTION

1. Field of the Invention

This invention relates to a label printer for issuing labels bearing characters and bar codes.

2. Description of the Related Art

Conventionally, the following label printer is known. The label printer receives issue label data transmitted as a control instruction from an external host computer, creates print pattern data according to the issue label data and then prints the created print pattern data on label paper for each line. The issue label data includes label size data for specifying the number of printing lines, printing data for specifying character rows and bar codes, format data for specifying the printing formats such as coordinates and magnification and the like. The label printer includes a frame memory for storing print pattern data of issuing labels. When print pattern data of issuing labels is stored into the frame memory, the data is maintained until it is replaced by print pattern data which is newly created according to a change of issuing labels.

In the actual label issuing operation, the label printer sets a data storing area for printing lines of the number corresponding to label size data in the frame memory, converts the printing data of one sheet of label into characters, numerals, or bar code patterns by use of a pattern generator, and then further converts the same into a format corresponding to the format data and stores it into the data storing area of the frame memory so as to create print pattern data. The print pattern data is read out and printed for each line.

In the above label printer, in a case where it is required to change part of the printing content during the label issuing operation, new print pattern data is first prepared in the frame memory and then the printing process for the succeeding labels is started. In general, since it takes a long time to create the print pattern data, it is difficult to quickly start the printing process. As a result, it is impossible to issue labels of different contents in a short period of time.

SUMMARY OF THE INVENTION

An object of this invention is to provide a label printer capable of issuing labels of different contents in a short period of time in a case where they are sequentially issued.

The above object can be attained by a label printer comprising an input section for sequentially inputting issue label data; a frame memory for storing one or more print pattern data; a printing section for printing each print pattern data stored in the frame memory; and a processing section for determining an empty area of the frame memory which is different from an area occupied by to-be-printed print pattern data when issue label data is input from the input section and creating print pattern data corresponding to the input issue label data in the empty area.

With the above label printer, when issue label data for the succeeding labels is input before the printing process for the preceding labels is completed and if an empty area whose capacity is large enough to store the print pattern data for the succeeding labels is available in the frame memory, print pattern data for the succeeding labels is created in the frame memory. As a result, the printing process for the succeeding label can be immediately started after the printing process for the preceding labels has been completed.

BRIEF DESCRIPTION OF THE DRAWINGS

FIG. 1 is a block diagram showing a circuit of a label printer according to one embodiment of this invention;

FIG. 2 is a block diagram showing the construction of a printing unit shown in FIG. 1;

FIG. 4 is a flowchart showing a printing process of the label printer;

DETAILED DESCRIPTION OF THE PREFERRED EMBODIMENTS

Figure 3:
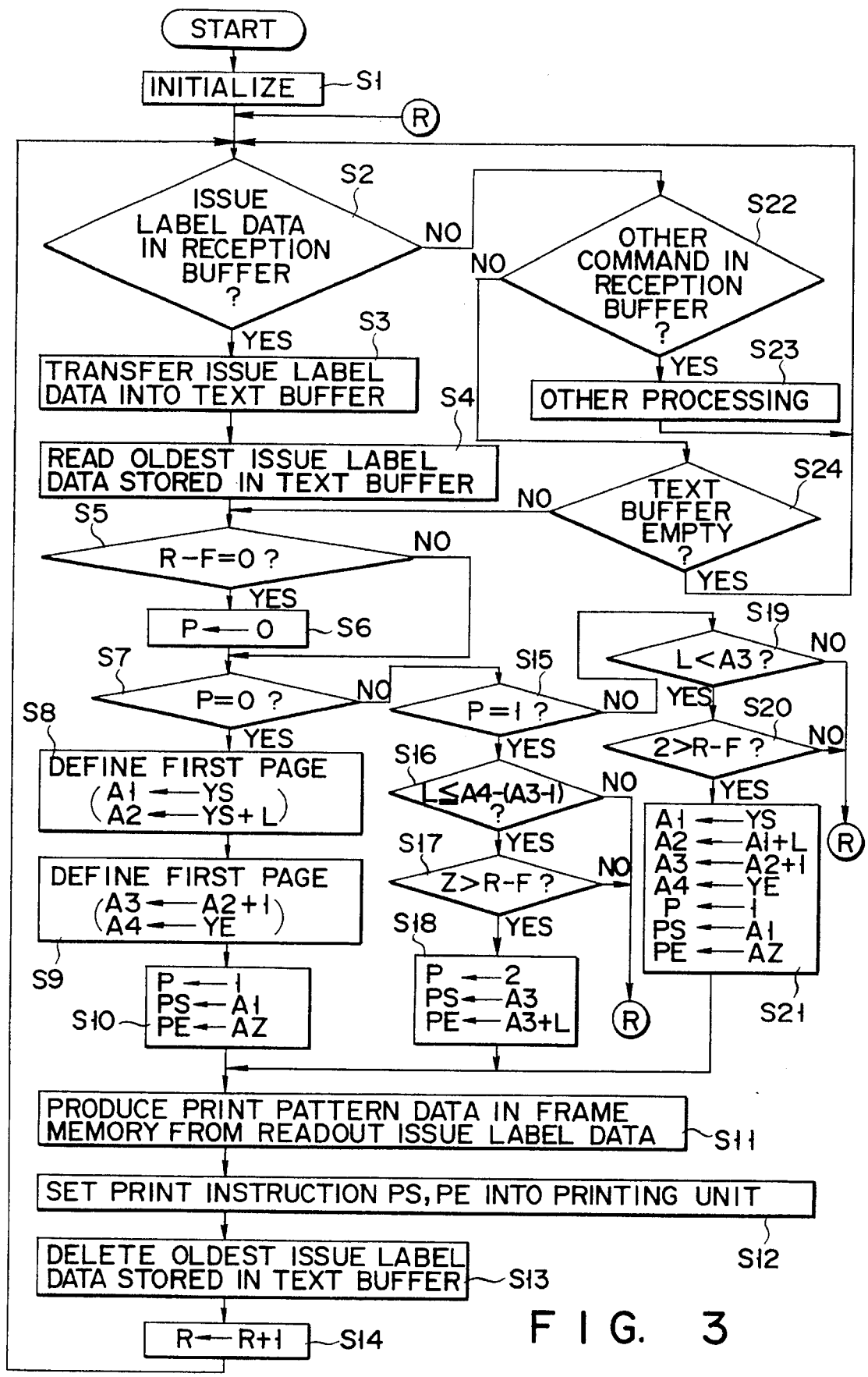
FIG. 3 is a flowchart showing a printing pattern creating process of the label printer.

There will now be described a label printer according to an embodiment of this invention with reference to FIGS. 1 to 6B.

FIG. 1 schematically shows a circuit of the label printer. The label printer includes a CPU 1, bus line 2, ROM 3, RAM 4, frame memory 5, communication interface 6, keyboard 7, keyboard circuit 8, and printing unit PT. The CPU 1 is connected to the ROM 3, RAM 4, frame memory 5, communication interface 6, keyboard 7, keyboard circuit 8, and printing unit PT via the bus line 2, and effects various data processings to control the whole printing operation. The ROM 3 is used to store a control program of the CPU 1 and other fixed data and includes a character generator storing character patterns corresponding to character (including numerals) codes and a numeral/bar code conversion table storing bar codes corresponding to numeral codes. The RAM 4 is used to temporarily store input/output data of the CPU 1 and includes a text buffer, reception buffer and various work registers. The communication interface 6 is used to receive control commands transmitted from an external host computer (not shown). The host computer sequentially supplies issue label data of labels to be issued as the control command to the communication interface 6. The issue label data contains label size data for specifying the number of printing lines, printing data for specifying character rows and bar codes, format data for specifying printing formats such as coordinates and magnification, print starting data, and the like. The control commands are temporarily stored in the reception buffer of the RAM 4 and then sequentially processed by the CPU 1. The text buffer is used to sequentially store items of issue label data transferred from the reception buffer. The frame memory 5 stores one or more print pattern data created based on the issue label data. Each print pattern data is written into the frame memory 5 via the bus line 2, and read out from the frame memory 5 and directly supplied to the printing unit PT when it is to be actually printed. The keyboard 7 includes various keys such as a power source switching key, paper feeding key, test printing key, character keys and numeral keys and generates a key signal corresponding to the operation of the key. The keyboard circuit 8 is used to input a key signal supplied from the keyboard 7 to the CPU 1.

FIG. 2 shows the construction of the printing unit PT. The printing unit PT includes a bus interface 20, CPU 21, bus line 22, ROM 23, RAM 24, head driver 9, thermal head 10, paper feeding motor 11 and motor driver 12. The CPU 21 is used to effect various data processings required for the operation control for the thermal head 10 and paper feeding motor 11, and in order to use the bus line 2 like the CPU 1, it is connected to the bus line 2 via the bus interface 20 and connected to the frame memory 5 in order to read out to-be-printed print pattern data. Further, the CPU 21 is connected to the ROM 23, RAM 24, head driver 9 and motor driver 12. The head driver 9 is connected to the thermal head 10 and the motor driver 12 is connected to the paper feeding motor 11. The ROM 23 is used to store the control program of the CPU 21 and other fixed data, and the RAM 24 is used to temporarily store input/output data of the CPU 21. Various work registers for storing printing parameters, an instruction buffer for storing instructions from the CPU 1, an area data buffer for storing printing area data included in the printing instruction and the like are assigned in the RAM 24. Printing pattern data is read out from the frame memory 5 and supplied to the CPU 21 and then stored into the RAM 24. The motor driver 12 receives print pattern data read out for each line from the RAM 24 by means of the CPU 21 and drives the thermal head 9 according to the print pattern data of each line. On the other hand, the motor driver 12 receives a feed instruction from the CPU 21 each time the thermal head 10 prints print pattern data of one line and drives the paper feeding motor 11 so as to feed the paper by a preset distance.

Figure 5:
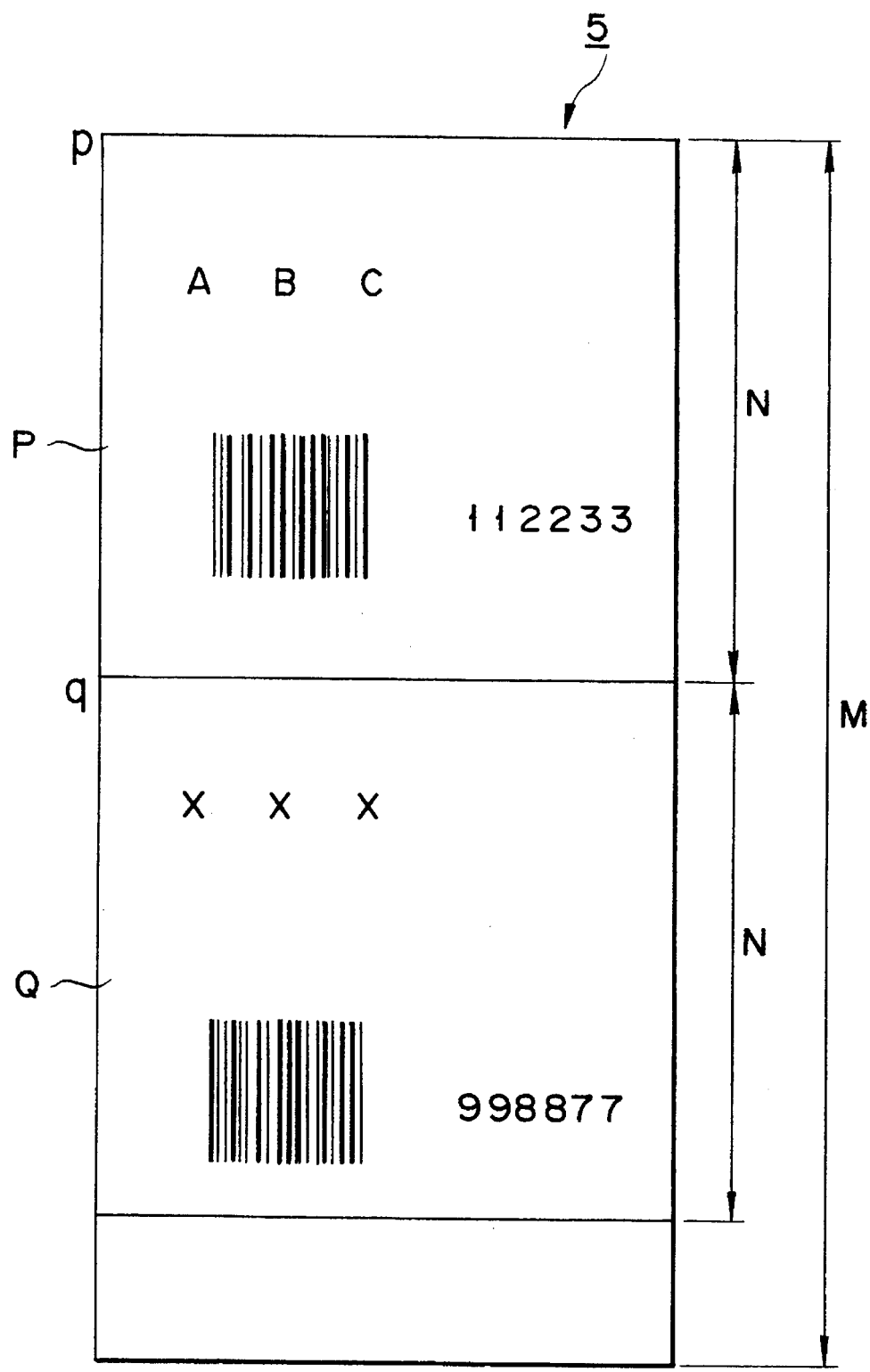
FIG. 5 is a diagram showing first and second print pattern data stored in the frame memory shown in FIG. 1.
Figure 6A:
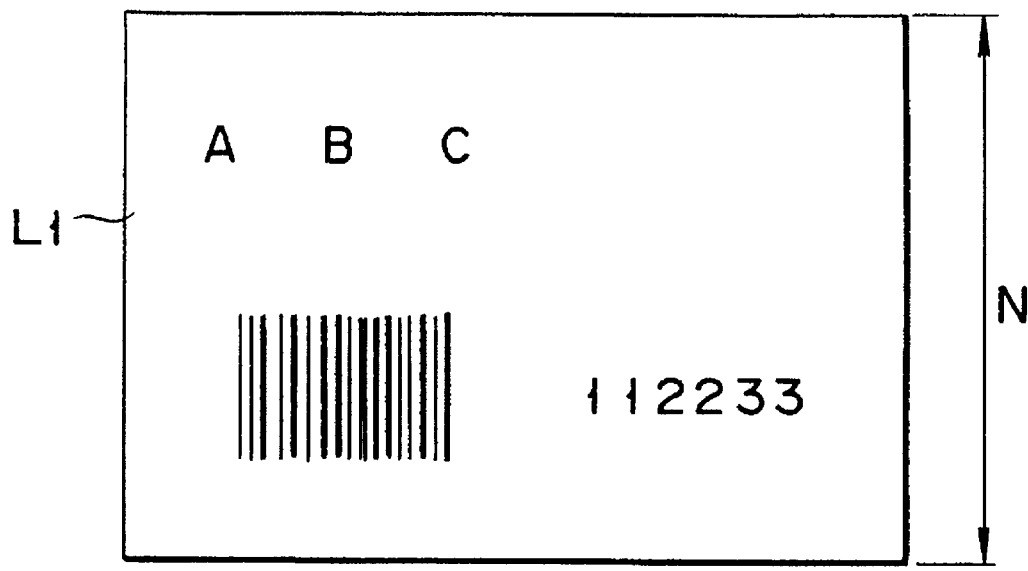
FIGS. 6A and 6B are diagrams showing first and second print pattern data printed on label paper.
Figure 6B:
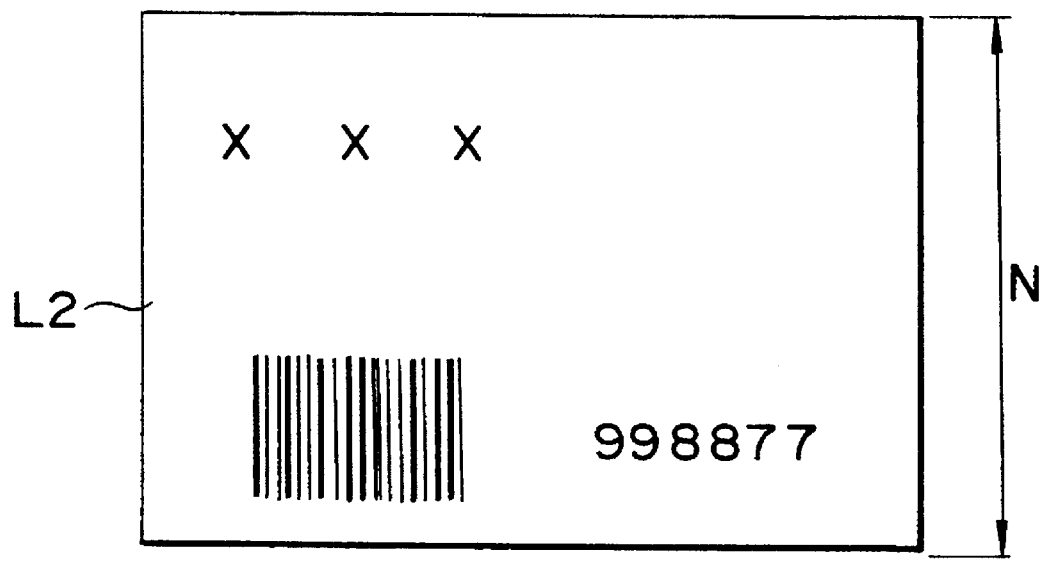

The frame memory 5 has a memory capacity of M lines which is set to be more than twice the printing line number N which is a standard value for labels issued from the label printer, as shown in FIG. 5. Various registers of the RAM 4 include a frame top pointer YS, frame bottom pointer YE, line number register L, storage counter R, print counter F, page pointer P, first head line pointer A1, first bottom line pointer A2, second head line pointer A3, second bottom line pointer A4, print starting line pointer PS, and print end line pointer PE. The frame top pointer YS is used to indicate the top area number of the frame memory 5 associated with the printing line, the frame bottom pointer YE is used to indicate the final area number of the frame memory 5 associated with the printing line, the line number register L is used to indicate the line number of print pattern data determined by label size data included in the issue label data, the storage counter R is used to indicate the number of operations of storing print pattern data into the frame memory 5, the print counter F is used to indicate the number of operations of printing the print pattern data stored in the frame memory 5, the page pointer P is used to indicate a page of print pattern data stored in the frame memory 5, the first head line pointer A1 is used to indicate an area number of the frame memory 5 allotted to the head line of the print pattern data of a first page, the first bottom line pointer A2 is used to indicate an area number of the frame memory 5 allotted to the bottom line of the print pattern data of the first page, the second head line pointer A3 is used to indicate an area number of the frame memory 5 allotted to the head line of the print pattern data of a second page, the second bottom line pointer A4 is used to indicate an area number of the frame memory 5 allotted to the bottom line of the print pattern data of the second page, the print starting line pointer PS is used to indicate an area number of the frame memory 5 in which the head line of print pattern data to be printed is stored, and the print end line pointer PE is used to indicate an area number of the frame memory 5 in which the bottom line of print pattern data to be printed is stored.

Next, the operation of the label printer is explained with reference to FIGS. 3 and 4. When the power source switch of the label printer is turned on, the CPU 1 executes the control program stored in the ROM 4 to effect the process of FIG. 3 and simultaneously, i.e. in parallel, the CPU 21 executes the control program stored in the ROM 23 to effect the process of FIG. 4.

When the process of FIG. 3 is started, the CPU 1 initializes the RAM 4, frame memory 5, communication interface 6 and the like in the step S1. In this initialization process, the text buffer and reception buffer of the RAM 4 are cleared, and the frame top pointer YS, frame bottom pointer YE, storage counter R, print counter F and page pointer P are respectively set to "1", "M", "0", "0" and "0". When it is detected in the step S2 that issue label data is stored in the reception buffer of the RAM 4, the issue label data is transferred from the reception buffer to the text buffer in the step S3. In the step S4, issue label data which was stored at the earliest time is read out from the text buffer and the line number of print pattern data determined by label size data included in the issue label data is stored into the line number register L. If it is detected in the step S5 that R−F=0, the page pointer P is set to "0" in the step S6 to indicate that to-be-printed print pattern data is not stored in the frame memory 5, and then the step S7 is effected. If it is not detected that R−F=0, the step S6 is omitted and the step S7 is effected.

If it is detected in the step S7 that P=0, the storage area numbers of the print pattern data of the first page are determined in the step S8 such that A1=Y and A2=YS+L, and the storage area numbers of the print pattern data of the second page are determined in the step S9 such that A3=A2+1 and A4=YE. In the step S10, "1" is set to the page pointer P to indicate that printing data of the first page is created and the storage area numbers "A1" and "A2" of the head line and bottom line of the, print pattern data are respectively set to the print starting line pointer PS and print end line pointer PE.

In the step S11, print pattern data is created in the frame memory 5 according to issue label data read out from the text buffer. The range in which the print pattern data is stored is indicated by the line pointers PS and PE. In the operation of creating the print pattern data, printing data included in the issue label data is sequentially converted into characters, numerals or bar codes by use of the numeral/bar code conversion table and the character generator of the ROM 3, and further converted into a format corresponding to format data included in the issue label data and then stored into the frame memory 5, thus constructing the print pattern data.

In the step S12, a printing instruction of the print pattern data is supplied to the printing unit PT. The contents of the line pointers PS and PE used as printing area data indicating the area of the frame memory 5 in which the created printing pattern is stored are added to the printing instruction. The issue label data used in the step S11 is cleared from the text buffer of the RAM in the step S13. After this, the content of the storage counter R is incremented by "1" in the step S14 and then the step S2 is effected again.

On the other hand, when to-be-printed print pattern data is stored in the frame memory 5, it is detected in the step S7 that P is not set at "0". If it is detected in the step S15 that the data is the print pattern data of the first page, it is determined in the step S16 that the line number (A4−(A3−1)) of the storage area of the printing pattern of the second page is not less than the line number L of print pattern data to be created and it is determined in the step S17 that the number (R–F) of to-be-printed print pattern data is less than "2". After this, "2" is set to the page pointer P in the step S18 to indicate that print pattern data of the second page is created, and the storage area numbers "A3" and "A3+L" of the head line and bottom line of the print pattern data are respectively set to the print starting line pointer PS and print end line pointer PE. Next, the step S11 is effected.

Further, if it is detected in the step S15 that the data is not the print pattern data of the first page, it is determined in the step S19 that the line number A3 of the storage area of the printing pattern of the first page is larger than the line number L of print pattern data to be created and it is determined in the step S20 that the number (R–F) of to-be-printed print pattern data is less than "2". After this, in the step S21, the storage area numbers of the print pattern data of the first page are set such that A1=YS and A2=A1+L, the storage area numbers of the print pattern data of the second page are set such that A3=A2+1 and A4=YE, "1" is set to the page pointer P to indicate that print pattern data of the first page is created, and the storage area numbers "A1" and "A2" of the head line and bottom line of the print pattern data are respectively set to the print starting line pointer PS and print end line pointer PE. Then, the above step S11 is effected.

If it is "NO" in the step S16, S17, S19 or S20, the step S2 is effected.

Further, if it is detected in the step S2 that issue label data is not stored in the reception buffer, it is checked in the step S22 whether or not another control command is stored in the reception buffer. If another instruction is stored in the reception buffer, a corresponding process is effected in the step S23, and then the step S2 is effected again. Further, if it is detected in the step S22 that another instruction is not stored in the reception buffer, the step S2 is effected again after it is, determined that the text buffer is empty in step S24. At this time, if it is detected that the text buffer is not empty, the step S5 is effected.

If the process of FIG. 4 is started in the printer unit PT, the CPU 21 initializes the RAM 24, head driver 9, motor driver 12 and the like in the step S30. In this initialization process, the instruction buffer, area data buffer and various work registers of the RAM 24 are all cleared. If it is detected in the step S31 that a printing instruction is stored in the instruction buffer of the RAM 24, printing area data PS and PE included in the printing instruction are stored into the area data buffer ill the step S32. Previously stored printing area data is read out in the step S33, print pattern data stored in a partial area of the frame memory 5 which is specified by the printing area data is read out in the step S34, and the print pattern data is printed on label paper in the step S35. In this printing process, the thermal head 10 and paper feeding motor 11 are driven to print the print pattern data for each line. Next, the printing area data used for the printing process is removed from the area data buffer in the step S36 and the content of the print counter F of the RAM 4 is incremented by "1" in the step S37. If the counter F is thus updated, the step S31 is effected again.

Further, if it is detected in the step S31 that a printing instruction is not stored, it is checked in the step S38 whether or not another instruction is stored in the instruction buffer. If another instruction is stored, a corresponding process is effected in the step S39, and then the step S31 is effected again. Further, if it is detected in the step S38 that another instruction is not stored, the step S31 is effected again after it is determined that the area data buffer is empty in step S40. In this case, if it is detected that the area data buffer is not empty, the step S33 is effected.

With the label printer of the above embodiment, second print pattern data can be created in the area Q of the frame memory 5 while simultaneously the first print pattern data created in the area P of the frame 5 is being printed as shown in FIG. 5. Therefore, after the print pattern data P has been printed, the second print pattern data can be immediately started to be printed and labels L1 and L2 of different contents shown in FIG. 6 can be continuously issued.

More specifically, when label issuing data for the label L1 is supplied from the host computer to the label printer, the position p shown in FIG. 5 is set into the storage position of the head line of print pattern data of the first page and an area of N lines corresponding to the size of the label L1 is determined to be the storage area P of the print pattern data with the position p set as the reference position. When the print pattern data for the label L1 is created in the area P, the print pattern data is read out from the frame memory 5 and then printed for each line by use of a combination of the thermal head 10 and the paper feeding motor 12.

When issue label data for the label L2 is supplied from the host computer to the label printer during the printing operation of the label L1, it is checked whether or not print pattern data for the label L2 can be created in an empty area of the frame memory 5 which is different from the area in which the print pattern data for the label L1 is stored. In a case where the size of the label L2 is the same as that of the label L1, the position q shown in FIG. 5 is set to the storage position of the head line of print pattern data of the second page and an area of N lines corresponding to the size of the label L2 is determined to be the storage area Q of the print pattern data with the position q set as the reference position. When the printing operation of the label L1 is completed after the print pattern data for the label L2 has been created in the area Q, the print pattern data of the label L2 is read out from the frame memory 5 and then printed for each line by use of a combination of the thermal head 10 and the paper feeding motor 12.

Further, since the area P can be freely used after the printing operation of the label L1 is completed, it becomes possible to create print pattern data for new labels in the area P. Thus, the label issuing time can be reduced without increasing the memory capacity of the frame memory.

This invention is not limited to the above embodiment and can be variously modified without departing from the technical scope thereof.

In the above embodiment, two CPUs are used to effect the printing pattern creating process and the printing process, but it is also possible to reduce the label issuing time by using a single CPU which can supply print pattern data to the printing unit upon completion of each printing operation.

What is claimed is:

1. A label printer comprising:

input means for inputting label data;

processing means for producing print pattern data of a variable size on the basis of the label data input by said input means;

memory means for storing a variable number of print pattern data each produced by said processing means; and printing means for sequentially printing the print pattern data store in said memory means;

wherein said processing means is operable in parallel with said printing means, and includes:

control means for confirming, when label data is input by said input means, that said memory means has a part which remains unoccupied with print pattern data to be printed and whose storage capacity is sufficient for new print pattern data, and for allowing the new print pattern data to be produced and stored in the remaining part of said memory means upon said confirmation, and wherein said control means includes assigning means for detecting a storage area storing print pattern data which has already been printed when said memory means is full, and assigning new print pattern data to the detected storage area; and partitioning means for partitioning said memory means into a plurality of storage areas, wherein said partitioning means includes means for, when the detected storage area does not have sufficient storage capacity, combining the detected storage area with at least one other storage area upon completion of printing of the print pattern data stored therein to obtain a storage capacity sufficient to store the new print pattern data.

2. A label printer according to claim 1, wherein said partitioning means partitions said memory means into said plurality of storage areas according to the label data initially input by said input means.

3. A label printer according to claim 1, wherein said control means includes registration means for allowing items of print pattern data produced in series to be stored in said plurality of storage areas.

4. A label printer according to claim 1, wherein said assigning means includes confirming means for confirming that the detected storage area has a storage capacity sufficient to store the new print pattern data.

5. A label printer comprising:

input means for inputting label data;

memory means for storing a variable number of print pattern data, and being partitioned into a plurality of storage areas;

processing means for:
  producing print pattern data of a variable size on the basis of label data input by said input means;
  confirming, when label data is input by said input means, that said memory means has a part which remains unoccupied with print pattern data to be printed and whose storage capacity is sufficient for new print pattern data; and
  allowing the new print pattern data to be produced and stored in a remaining part of said memory means; and printing means operable in parallel with said processing means, for sequentially printing the print pattern data stored in said memory means;

wherein said processing means detects a storage area storing print pattern data which has already been printed when said memory means is full, and assigns new print pattern data to the detected storage area; and wherein said processing means includes means for, when the detected storage area does not have sufficient storage capacity, combining the detected storage area with at least one other storage area upon completion of printing of the print pattern data stored therein to obtain a storage capacity sufficient to store the new print pattern data.

6. A label printer according to claim 5, wherein said memory means is partitioned into said plurality of storage areas according to the label data initially input by said input means; and said processing means allows items of print pattern data produced in series to be stored in said plurality of storage areas.

7. A label printer according to claim 5, wherein said processing means confirms that the detected storage area has storage capacity sufficient to store the new print pattern data.

8. A printing method comprising the steps of:

inputting label data;

producing print pattern data of a variable size on the basis of input label data;

storing in a memory means a variable number of print pattern data each produced in said producing step; and sequentially printing the print pattern data stored in said memory means;

wherein said producing step is performed in parallel with said printing step and includes a control step comprising the steps of:
  confirming, when label data is input, that said memory means has a part which remains unoccupied with print pattern data to be printed and whose storage capacity is sufficient for new print pattern data, and
  allowing the new print pattern data to be produced and stored in the remaining part of said memory means upon said confirmation;

wherein said step of producing print pattern data includes a partitioning step of partitioning said memory means into a plurality of storage areas;

wherein said control step includes an assigning step of detecting a storage area storing print pattern data which has already been printed when said memory means is full and assigning new print pattern data to the detected storage area; and wherein said partitioning step includes a step of, when the detected storage area does not have sufficient storage capacity, combining the detected storage area with at least one other storage area upon completion of printing of the print pattern data stored therein to obtain a storage capacity sufficient to store the new print pattern data.

9. A printing method according to claim 8, wherein said partitioning step partitions said memory means into said plurality of storage areas according to the label data which is initially input.

10. A printing method according to claim 9, wherein said control step further includes a registration step of allowing items of print pattern data produced in series to be stored in said plurality of storage areas.

11. A printing method according to 8, wherein said assigning step includes a step of confirming that the detected storage area has a storage capacity sufficient to store the new print pattern data.

* * * * *

UNITED STATES PATENT AND TRADEMARK OFFICE
CERTIFICATE OF CORRECTION

PATENT NO. : 5,560,718
DATED : October 1, 1996
INVENTOR(S) : Kazutoshi FURUYA

It is certified that error appears in the above-indentified patent and that said Letters Patent is hereby corrected as shown below:

Title Page, [73] Assignee, replace "Tokyo, Japan" with --Shizuoka, Japan--.

Title Page, [30], under the heading Foreign Application Priority Data, replace "2-65683" with --2-65863--.

Signed and Sealed this

Fifth Day of August, 1997

Attest:

Attesting Officer

BRUCE LEHMAN

Commissioner of Patents and Trademarks